United States Patent
Rathgeber

(10) Patent No.: US 9,694,457 B2
(45) Date of Patent: Jul. 4, 2017

(54) FEEDING DEVICE FOR A FORMAT MACHINING AND/OR EDGE APPLICATION MACHINE, FORMAT MACHINING AND/OR EDGE APPLICATION MACHINE AND METHOD

(71) Applicant: Homag Holzbearbeitungssysteme GmbH, Schopfloch (DE)

(72) Inventor: Peter Rathgeber, Dornstetten (DE)

(73) Assignee: HOMAG HOLZBEARBEITUNGSSYSTEME GMBH, Schopfloch (DE)

( * ) Notice: Subject to any disclaimer, the term of this patent is extended or adjusted under 35 U.S.C. 154(b) by 0 days.

(21) Appl. No.: 14/881,194

(22) Filed: Oct. 13, 2015

(65) Prior Publication Data

US 2016/0107281 A1 Apr. 21, 2016

(30) Foreign Application Priority Data

Oct. 16, 2014 (DE) .......................... 10 2014 221 008

(51) Int. Cl.
| | |
|---|---|
| *B65G 39/18* | (2006.01) |
| *B23Q 7/18* | (2006.01) |
| *B65G 21/20* | (2006.01) |
| *B27C 5/06* | (2006.01) |
| *B27M 1/08* | (2006.01) |
| *B23Q 7/03* | (2006.01) |

(52) U.S. Cl.
CPC ................ *B23Q 7/18* (2013.01); *B23Q 7/03* (2013.01); *B27C 5/06* (2013.01); *B27M 1/08* (2013.01); *B65G 21/2045* (2013.01); *B65G 39/18* (2013.01)

(58) Field of Classification Search
CPC ... B23Q 7/03; B23Q 7/18; B27M 1/08; B27C 5/06; B65G 15/12; B65G 21/20; B65G 21/2045; B65G 21/2072; B65G 39/18
USPC ............ 198/345.1, 836.3, 836.4, 626, 626.1
See application file for complete search history.

(56) References Cited

U.S. PATENT DOCUMENTS

| | | |
|---|---|---|
| 3,327,839 A | 6/1967 | Sigety et al. |
| 3,951,256 A | 4/1976 | Gurewitz |
| 4,015,484 A | 4/1977 | Taylor |

(Continued)

FOREIGN PATENT DOCUMENTS

| | | |
|---|---|---|
| DE | 1531867 A | 1/1970 |
| DE | 2303870 A1 | 10/1973 |

(Continued)

OTHER PUBLICATIONS

European Search Report issued Mar. 22, 2016 with respect to EP Application No. 15189723/8—a potential related application—cited only for references that are disclosed therein.

(Continued)

*Primary Examiner* — Mark A Deuble
(74) *Attorney, Agent, or Firm* — Scott R. Cox

(57) ABSTRACT

A feeding device, a method for feeding panel-shaped workpieces through that device, and a format machining or edge application machine including such feeding device are disclosed. The feeding device includes at least one infeed guide, which is adjustable in a horizontal direction, and rotatable in a horizontal plane with respect to the traveling direction of the workpiece.

22 Claims, 9 Drawing Sheets

(56) References Cited

U.S. PATENT DOCUMENTS

| | | | |
|---|---|---|---|
| 4,638,756 A * | 1/1987 | Collmann | B29D 30/0016 |
| | | | 118/215 |
| 4,750,254 A | 6/1988 | Kalmbach | |
| 4,979,605 A * | 12/1990 | Svyatsky | B07C 3/20 |
| | | | 101/47 |
| 5,944,477 A * | 8/1999 | Shill | B65H 31/34 |
| | | | 198/345.1 |
| 2004/0182214 A1 | 9/2004 | Courtois et al. | |
| 2008/0116042 A1 * | 5/2008 | McAlister | B65G 21/2072 |
| | | | 198/836.3 |
| 2009/0183972 A1 | 7/2009 | Gauss et al. | |
| 2010/0154933 A1 | 6/2010 | Hatch, Jr. et al. | |
| 2013/0277176 A1 * | 10/2013 | Corlett | B65G 17/44 |
| | | | 198/626.1 |
| 2016/0176651 A1 * | 6/2016 | Landler | B65G 21/2054 |
| | | | 198/395 |

FOREIGN PATENT DOCUMENTS

| | | | |
|---|---|---|---|
| DE | 8114121 U1 | 5/1981 | |
| DE | 4234681 C2 | 1/1997 | |
| DE | 102004049436 A1 | 4/2006 | |
| DE | 202009007100 U1 | 8/2009 | |
| DE | 102013012422 A1 | 1/2014 | |
| DE | 3009244 A1 * | 4/2016 | ............. B23Q 7/03 |
| EP | 1479492 B1 | 5/2006 | |
| EP | 0917935 B1 | 9/2009 | |
| EP | 2253441 A1 | 11/2010 | |
| EP | 2253442 A1 | 11/2010 | |
| EP | 2614940 A1 | 7/2013 | |
| FR | 775514 A | 12/1934 | |
| FR | 2660292 A1 | 10/1991 | |
| GB | 509048 A | 6/1939 | |
| IT | RN20120053 A1 | 5/2014 | |
| JP | 2003292275 A | 10/2003 | |
| JP | 2005264193 A | 9/2005 | |
| WO | WO2004113037 A1 | 12/2004 | |

OTHER PUBLICATIONS

European Search Report issued Mar. 2, 2016 with respect to EP Application No. 15181960.4—a potential related application—cited only for references that are disclosed therein.

* cited by examiner

FEEDING DEVICE FOR A FORMAT MACHINING AND/OR EDGE APPLICATION MACHINE, FORMAT MACHINING AND/OR EDGE APPLICATION MACHINE AND METHOD

TECHNICAL FIELD

The present invention relates to a device for feeding preferably panel-shaped workpieces as well as a format machining and/or edge application machine comprising such a feeding device.

The mentioned workpieces are, for example, made of wood or contain derived timber products or synthetic material. The feeding device and the format machining and/or edge application machine are in particular used in the furniture and structural element industry. Moreover, the present invention relates to a method.

PRIOR ART

One-sided format machining and/or edge application machines for the subsequent multi-sided edge machining of workpieces are generally already known. During a first pass, a workpiece is usually aligned with respect to a first guide on the fixed machine side, and in a second pass, the workpiece is guided along a second guide on the movable machine side. Moreover, it is possible to perform both passes for applying opposite edges on a guide of the movable machine side.

As a further alternative, it is known, during a first pass and the alignment of the workpiece on the machine side, to simultaneously mill the workpiece to dimension in parallel on the movable machine side. The second pass of the workpiece is also performed at the guide of the fixed machine side on the reference edge already milled. In the subsequent two passes, the workpiece is fed to a positioning stop at the precise angle by means of latches or cam rails such that a defined transverse dimension is created.

For example, a device according to DE 81 421 121 U1 is known, which is directed at a continuously working one-sided format and/or edge banding machine for the subsequent four-sided edge machining of panel-shaped workpieces. This device comprises at least one stop and at least one guide for arranging the workpieces to dimension and at the precise angle as well as a slide which can be shifted to and fro parallel to the workpiece traveling direction, on which the stop and the guide are mounted. The guide is pivotable about a vertical axis and can be fixed on a slide in predetermined angle positions.

THE SUBJECT MATTER OF THE INVENTION

It is the object of the present invention to provide a device with which preferably panel-shaped workpieces with possibly different lengths and widths can be fed in batch size 1 to a machining unit to dimension and at the precise angle.

The subject matter of claim 1 provides a solution for this. Further preferred embodiments which can be combined with each other individually are to be found in the dependent claims. Moreover, the present invention provides a method.

The core idea of the present invention is an alignment mechanism which can be adjusted in accordance with a determined inclination of a side of a workpiece to be machined and/or to be coated relative with respect to a reference side. Thus, each individual workpiece can be aligned such in the region of a feeding device that the subsequent machining, for example cutting machining and/or edge application, can be performed at the workpiece precisely pre-positioned.

The present feeding device has the advantage that workpieces can always be aligned with respect to the fixed machine side, where the at least one infeed guide can be received in the most stable manner. Thus, a positioning at a guide or stop on the movable machine side is not necessary.

Moreover, a workpiece does not have to be leaned against or guided along a guide or positioning stop with the decorative edge (side with edge material already applied), as was common in the prior art. For this reason, scratches, shiny marks, damages of the protective foils etc. are prevented, and a machining result of high quality is ensured.

Furthermore, the present invention provides a relatively cheap solution since no reference milling cutter, portal for a positioning stop or adjustable longitudinal guide has to be provided on the movable machine side.

Since only relatively small adjusting movements are necessary at the at least one infeed guide, highest cycle performances and forward speeds can be achieved for the batch size 1 production.

Moreover, the workpiece gaps can be further reduced by the variable mechanics, and thus together with the increased traveling speed the production performance can be further enhanced.

Preferably, a control device is adapted so as to horizontally adjust the at least one infeed guide in accordance with a width determined in a previous pass of the workpiece and to rotate it in the horizontal plane in accordance with an inclination determined in a previous pass of the workpiece. Thus, a safe alignment and guiding of the workpieces is achieved.

In this respect, the control device can be adapted so as to guide the at least one infeed guide after the alignment of a workpiece depending on the conveying speed of the workpiece, in particular to adjust the at least one infeed guide in the horizontal direction.

In a further variant, plural, in particular three, infeed guides are provided, each of which is adjustable in a horizontal direction and rotatable in the horizontal plane with respect to the traveling direction, such that a safe alignment is possible with a shorter work cycle.

Preferably, the feeding device further comprises a first measuring device adapted so as to detect along the traveling direction a width dimension of a workpiece and an inclination of a side of the workpiece.

The feeding device can further comprise a second measuring device adapted so as to detect transversely to the traveling direction the inclination of a side of the workpiece, with the second measuring device preferably comprising a first sensor (30) and a second sensor, which are arranged along an imaginary line extending perpendicular to the traveling direction.

In a further embodiment, the feeding device can comprise a third measuring device adapted so as to determine the workpiece width after the machining of a side of the workpiece, in particular after a cutting machining and/or an edge application. This third measuring device is therefore used for the so-called edge compensation.

According to a further embodiment, the feeding device comprises a fourth measuring device adapted so as to detect along the traveling direction a workpiece width and/or an inclination of a side of the workpiece, with the fourth measuring device being arranged in a region, before the workpiece is handed over to the format machining and/or edge application machine. The fourth measuring device can therefore be used for the fine adjustment of the alignment.

DETAILED DESCRIPTION OF THE PREFERRED EMBODIMENTS

Figure 1:
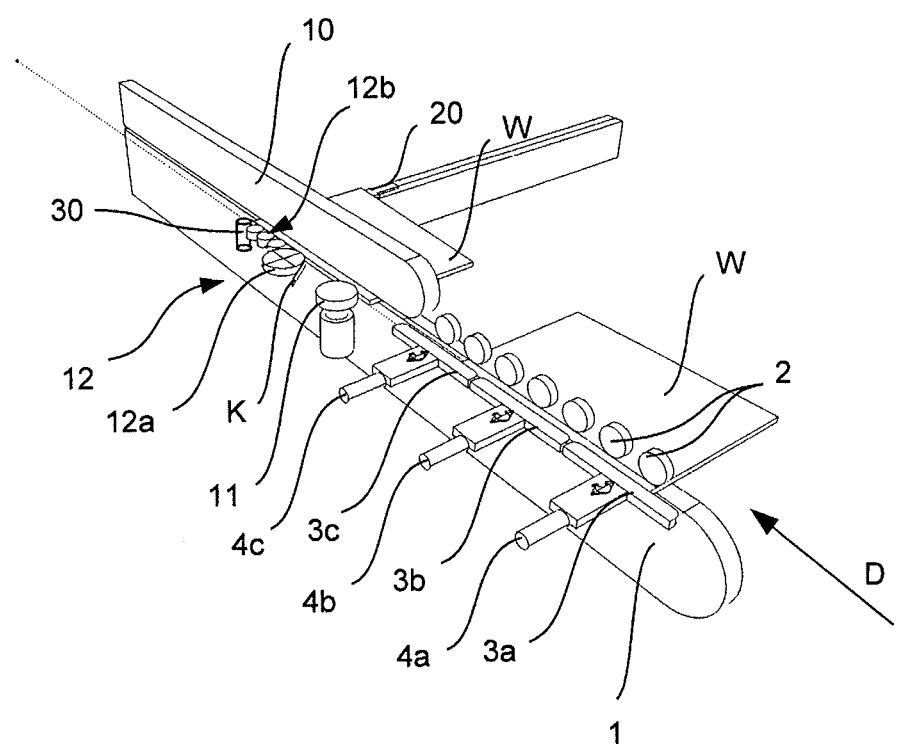
FIG. 1 shows a first pass of panel-shaped workpieces through a device according to an embodiment of the present invention.

In the following, a device and an operation using an embodiment of the present invention as well as modifications thereof will be explained by means of the enclosed figures. Individual features of the respective further developments of the described embodiment can be combined with each other in order to form new embodiments.

In the present case, "longitudinally oriented" describes an alignment of the workpiece such that the longer sides of the workpiece face the traveling direction D. On the other hand, "transversely oriented" describes an alignment rotated by 90° (the possibly shorter transverse side of a workpiece faces the traveling direction D). Of course, square workpieces can also be machined with the present format machining and/or edge application machine. Moreover, the sequence of longitudinal and transverse orientation in the course of the subsequent passes, which is described below, is not to be understood in a restrictive manner, but can also be performed in another order.

The present embodiment shows a one-sided format machining and/or edge application machine comprising a feeding device. This means that in one pass one side of the workpiece is machined and/or provided with an edge material strip.

The feeding device with the format machining and/or edge application machine comprises a lower conveying device 1 in the vertical direction, which comprises a conveying element endlessly circulating about, for example a conveying belt or a conveying chain. In the present embodiment, the conveying device 1 extends in the horizontal direction such that the conveying device 1 is also used for feeding workpieces to the actual format machining and/or edge application machine. However, a conveying mechanism arranged separately by the conveying device 1 can also be provided for feeding workpieces.

In the region of the feeding device, plural infeed rollers 2 are located in the vertical direction above the lower conveying device 1. The infeed rollers 2 can push the workpieces against the infeed guides 3a to 3c.

Between the infeed rollers 2 and the conveying element, for example the conveying belt or the conveying chain, of the lower conveying device 1, workpieces can be held and conveyed in the traveling direction D. A certain clamping force is applied in order to hold the workpieces. At the same time, the workpieces W are pushed against the infeed guides 3a to 3c explained below.

In the present embodiment, three infeed guides 3a to 3c arranged one behind the other in the traveling direction D are located on one side of the infeed rollers 2, which are shifted individually in the horizontal direction by means of respective drives 4a to 4c and which can be pivoted about a rotational axis aligned in the vertical direction. The three infeed guides 3a to 3c are each individually controllable and can be rotated, in addition to the horizontal movement, relative with respect to the traveling direction D (conveying direction) of the workpieces W in the horizontal plane.

In further modifications, the present embodiment can also comprise fewer or more infeed guides, for example also only one infeed guide.

In the traveling direction D behind the infeed rollers 2 and the infeed guides 3a to 3c, the actual format machining and/or edge application machine is located, which comprises a top pressure 10 arranged in the vertical direction above the conveying device 1, that pushes a workpiece W against the conveying element of the conveying device 1 with a conveying element endlessly circulating about and that conveys it in the traveling direction D. The top pressure 10 applies a higher pressure force on the workpiece over the infeed rollers 2 in order to safely hold the workpiece in the region of the sides during the machining.

On the same side as the infeed guides 3a to 3c (machine side) with respect to the lower conveying device 1, a machining tool 11 is provided, in particular a milling cutter. The tool 11 is adapted so as to machine a side of a workpiece W which is held and guided between the conveying element of the conveying device 1 and the conveying element of the top pressure 10.

In the traveling direction D behind the machining tool 11, an edge application station 12 is located, with which an edge band strip K is applied to a side of a workpiece W. This edge band strip K is cut to dimension with a cutting device not shown, and it is pushed against the side of a workpiece W and thereby connected thereto by a pressure roller 12a and in the present example by plural further rollers 12b.

The format machining and/or edge application machine further comprises a first measuring device 20 in order to determine a width dimension of the workpieces W and an inclination of a side of the workpieces W. In the present embodiment example, the measuring device 20 is arranged substantially opposite the edge application station 12 (machine side) and is movable perpendicular to the traveling direction. Preferably, the first measuring device 20 is a contact sensor. However, the first measuring device 20 can also be configured as a contactless operating sensor.

The first measuring device 20 is adapted so as to detect along the traveling direction D a width dimension of a workpiece W and an inclination of a side of the workpiece W. The mentioned side of the workpiece is the side to be machined and/or provided with an edge material strip in the next pass.

Furthermore, a second measuring device 30, 40 is provided (in this respect, see also FIG. 9), which comprises a first sensor 30 and a second sensor 40. In the present embodiment, the second measuring device 30, 40 is provided in the traveling direction D behind the edge application station 12.

The first sensor 30 and the second sensor 40 of the second measuring device are arranged along an imaginary line extending transversely to the traveling direction. Since each of the sensors 30, 40 determines regions of a transverse side of the workpiece W, the inclination of the transverse side of the workpiece W can be calculated from this. To achieve an optimal result, the sensors 30, 40 are arranged such that the detected regions of the transverse side of the workpiece are relatively widely spaced apart from each other. In other words, regions of the transverse side of the workpiece W are detected, which lie in the region of the edges of the workpiece W.

Furthermore, the shown device comprises a third measuring device 50 which optionally can be used for edge compensation (inter alia, material deviations of the applied edge strip etc.).

Figure 6:
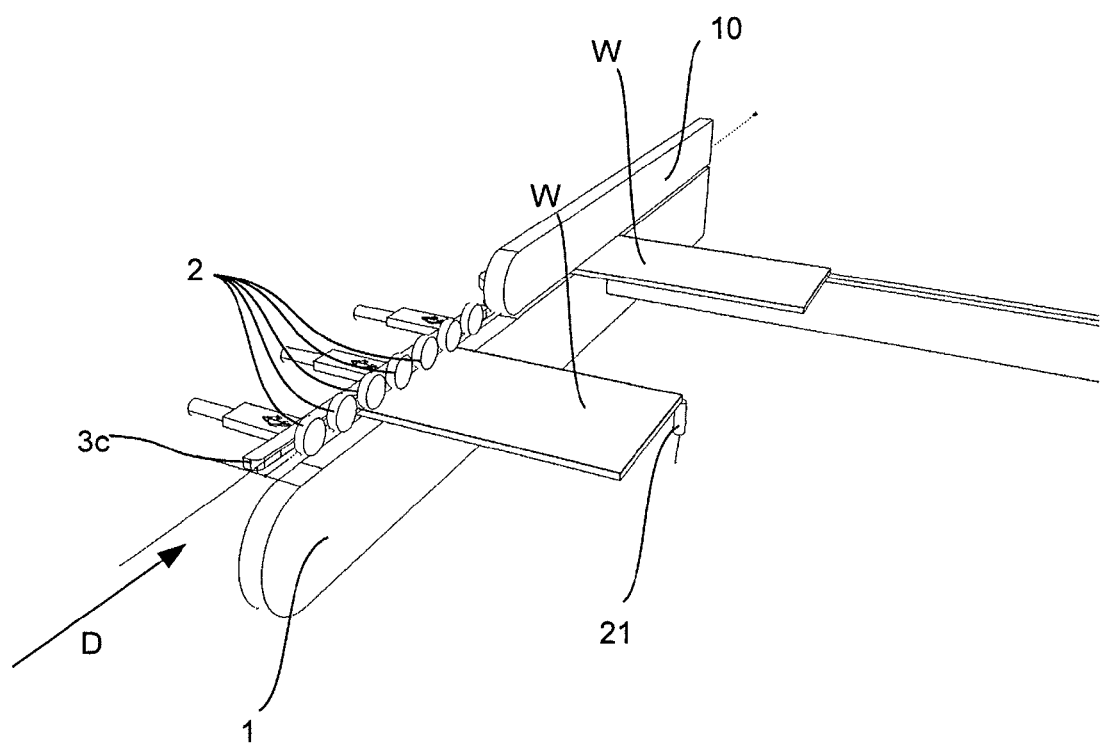
FIG. 6 shows a view of the second embodiment in the fourth pass, which corresponds to FIG. 5.

Moreover, a tactile fourth measuring device 21 is provided in FIG. 6, which can be used for fine adjustment during the alignment of a workpiece before it is handed over to the machining region.

The functionality of the measuring devices and the machining of a workpiece in four passes are explained in detail below.

First, a workpiece W is fed in a first pass in a longitudinally oriented manner, with the infeed guides 3a to 3c forming a reference plane. In the first pass, the reference plane is aligned in accordance with the traveling direction D.

The infeed rollers 2 guide a workpiece along the infeed guides 3a to 3c such that the workpiece is handed over to the top pressure 10 in an aligned manner. In the region of the top pressure 10, the workpiece is held in the vertical direction with a significantly higher force and is further conveyed in the traveling direction D. By the workpiece W being guided past the machining tool 11, the machining tool 11 can machine a first side of the workpiece W, in particular create a planar side. After that, an edge material strip K is applied to this first side of the workpiece W previously machined by the machining tool 11.

Moreover, in the first pass a width dimension and an inclination of a second side of the workpiece W in relation to the opposite first side already machined are detected by the first measuring device 20. This dimension is used for the further machining of the workpiece W in the second pass described below. On the so-called machining side, the glued edge with the workpiece protrusion can additionally be measured by means of the sensor 50 (edge compensation).

In the second pass, the workpiece W is rotated by 180 degrees such that a second side of the workpiece W opposite the first side already machined can be machined and provided with an edge.

For this, the workpiece W is fed in a longitudinally oriented manner. The infeed guides 3a to 3c are positioned opposite the first side already machined (horizontally adjusted and rotated about the vertical axis) in accordance with the inclination and width of the second side to be machined, which have been detected in the first pass, such that, after the alignment of the workpiece by the machining tool 11, a side parallel to the first side can be configured.

Before the workpiece W is conveyed below the top pressure 10, the individual infeed guides 3a to 3c begin to adjust themselves orthogonally with respect to the conveying direction depending on the conveying speed such that a workpiece can be produced with the fixed machining tool 11, which is parallel and which comes up to the requested dimensions.

In the region of the top pressure 10, the transverse side of the workpiece is further measured by means of the two measuring devices (sensors) 30, 40 in order to detect the inclination of a third side of the workpiece W in relation to the first and/or second side of the workpiece W. For this, the first measuring device 20 can detect or scan the transverse side during the pass. This information is used for the new alignment of the workpiece W in the third pass described below.

In the third pass, the workpiece W is fed in a transversely oriented manner such that the third side can be guided past the machining tool 11 and the edge application station 12. The infeed guides 3a to 3c are positioned in accordance with the inclination of the third side of the workpiece W determined in the second pass. In this respect, the infeed guides 3a to 3c begin to adjust themselves orthogonally with respect to the traveling direction D depending on the conveying speed such that the angularity of the workpiece W is compensated. In other words, a 90 degree angle with respect to the first and second sides already machined can be achieved in accordance with the alignment of the workpiece W by using the fixed machining tool 11. During the third pass, the longitudinal dimension is detected by using the first measuring device 20, and the inclination of the fourth side of the workpiece with respect to the third side of the workpiece W is determined. On the machining side, the glued edge with the workpiece protrusion can additionally be measured by means of the sensor 50 (edge compensation).

After that, the fourth pass is performed. In this respect, the workpiece W is fed in a transversely oriented manner such that the fourth side of the workpiece W not yet machined faces the direction of the infeed guides 3a to 3c, and the infeed guides 3a to 3c are positioned in accordance with the inclination of the fourth side of the workpiece previously determined. Before the workpiece W is conveyed below the top pressure 10, the infeed guides 3a to 3c begin to adjust themselves orthogonally with respect to the traveling direction D depending on the conveying speed such that the workpiece can be guided to the machining tool 11 in a correct alignment. After that, the fourth side of the workpiece W is machined with the machining tool, and an edge material strip is applied to the fourth side of the workpiece W.

In a further modification of the present invention, if workpieces have extreme longitudinal or transverse dimensions, it is possible to support the feeding of the workpieces W by a latch or cam system, with the workpieces being shifted by one or plural cams.

Figure 2:
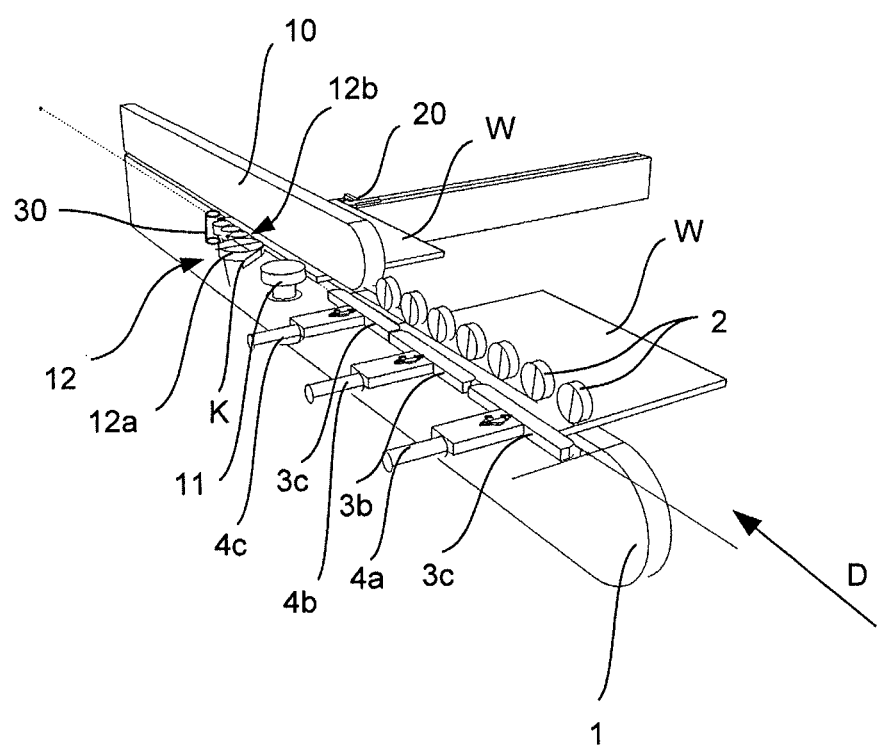
FIG. 2 shows a second pass of the workpieces through a device according to the embodiment of the present invention.
Figure 3:
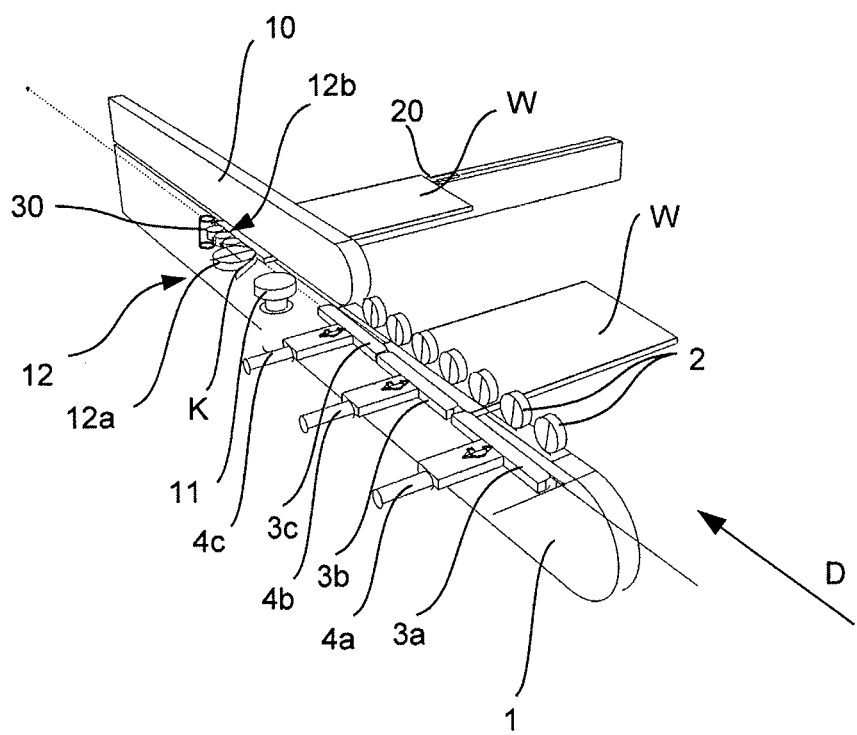
FIG. 3 shows a third pass of the workpieces through a device according to the embodiment of the present invention.
Figure 5:
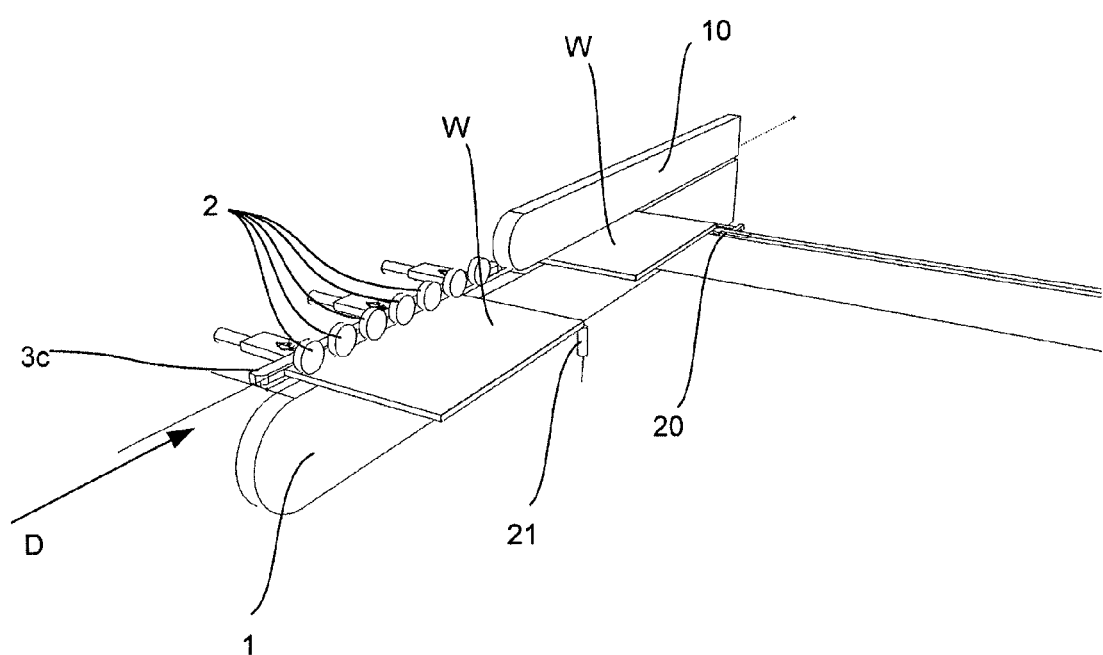
FIG. 5 shows an embodiment of the present invention in the second pass, in which an additional sensor is provided.

FIG. 5 shows a second pass (corresponding to FIG. 2) according to a second embodiment of the present invention. In addition to the first embodiment, a fourth measuring device 21 (contactless sensor) is provided opposite the infeed guides 3a to 3c. With the sensor 21, the parallelism and the width of the workpiece are detected shortly before the workpiece W is handed over to the top pressure 10, and optionally the infeed guides 3a to 3c are adjusted, or possibly only the infeed guide 3c arranged subsequently in the traveling direction is adjusted. Thus, a fine adjustment or readjustment of the alignment of the infeed guides 3a to 3c can be performed before the workpiece W is clamped and subsequently machined by means of the top pressure 11.

Figure 4:
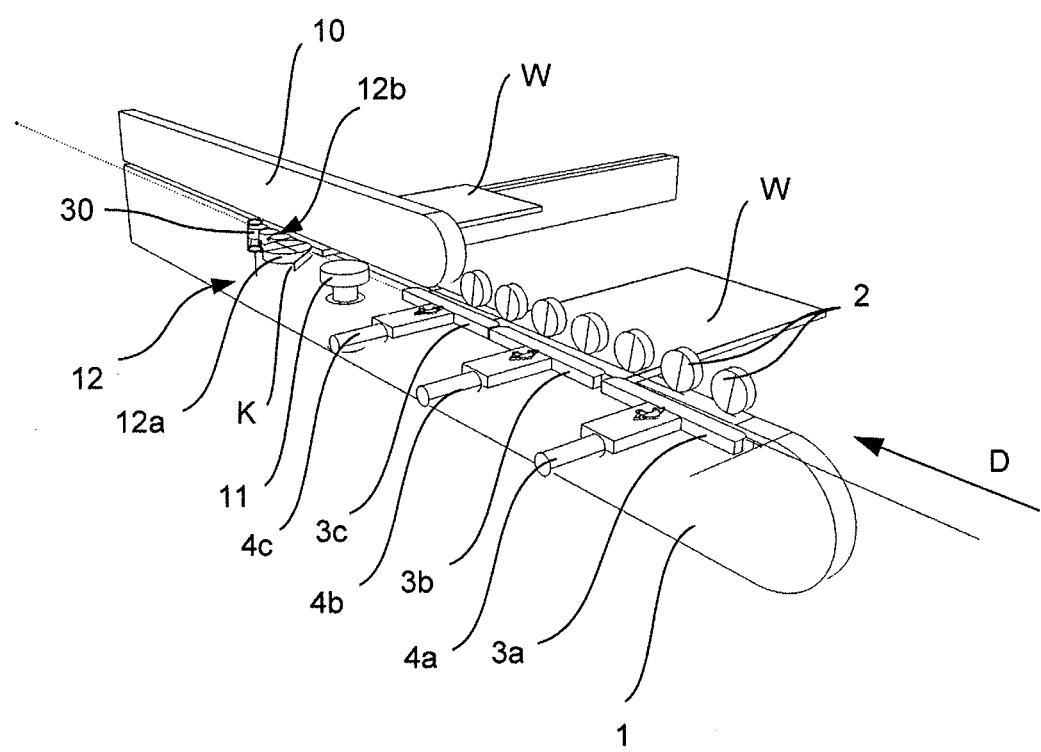
FIG. 4 shows a fourth pass of the workpieces through a device according to the embodiment of the present invention.

FIG. 6 shows the second embodiment in the fourth pass (according to FIG. 4), with the sensor 21 being used again.

In the previously described embodiments, the measuring devices 20, 50 are configured as tactile measuring systems. However, the present invention is not restricted to the use of tactile measuring systems, but in one or plural of the mentioned measuring devices 20, 50 a measurement can be performed without contact, in particular by means of digital image processing or a laser measuring device.

The sensors 30, 40 of the second measuring device can also be configured both as contact sensors (tactile measuring system) and as contactless sensors.

Moreover, the sensor 21 in the embodiment shown in FIGS. 5 and 6 is a contactless sensor. However, a contact sensor 21' can also be used instead of the sensor 21 (tactile measuring system), which is explained again in connection with FIG. 9.

According to a further modification, the measuring of the workpiece, in particular the detection of the width dimension transversely to the traveling direction D and of the inclination of a side of the workpiece not yet machined can also be performed outside the machine shown. The determined data are manually input into a control device of the feeding device or transmitted to the control device by the measuring tool used for detecting the width dimension and the inclination.

In the present embodiments, a machining tool 11 is shown. However, it is evident that plural machining tools arranged in the traveling direction can also be provided, which perform different machining processes. Tools for preparing the edge application can be provided, inter alia, for example in order to grind the side of the workpiece to be coated with the edge material strip K, to apply a means for sealing pores or to apply an adhesive agent to the workpiece.

Figure 7:
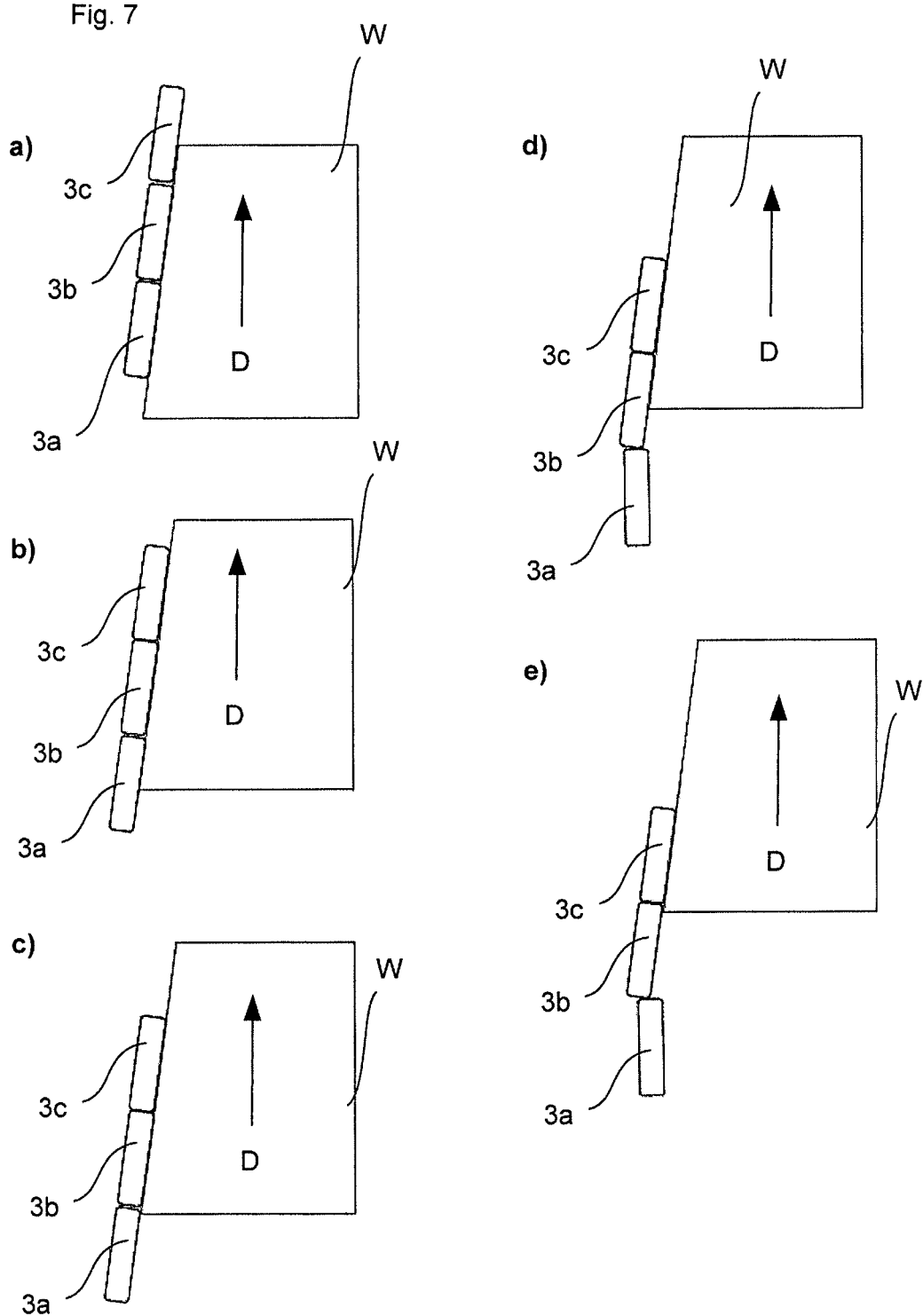
FIG. 7 illustrates an alignment operation with a feeding device according to the invention.
Figure 8:
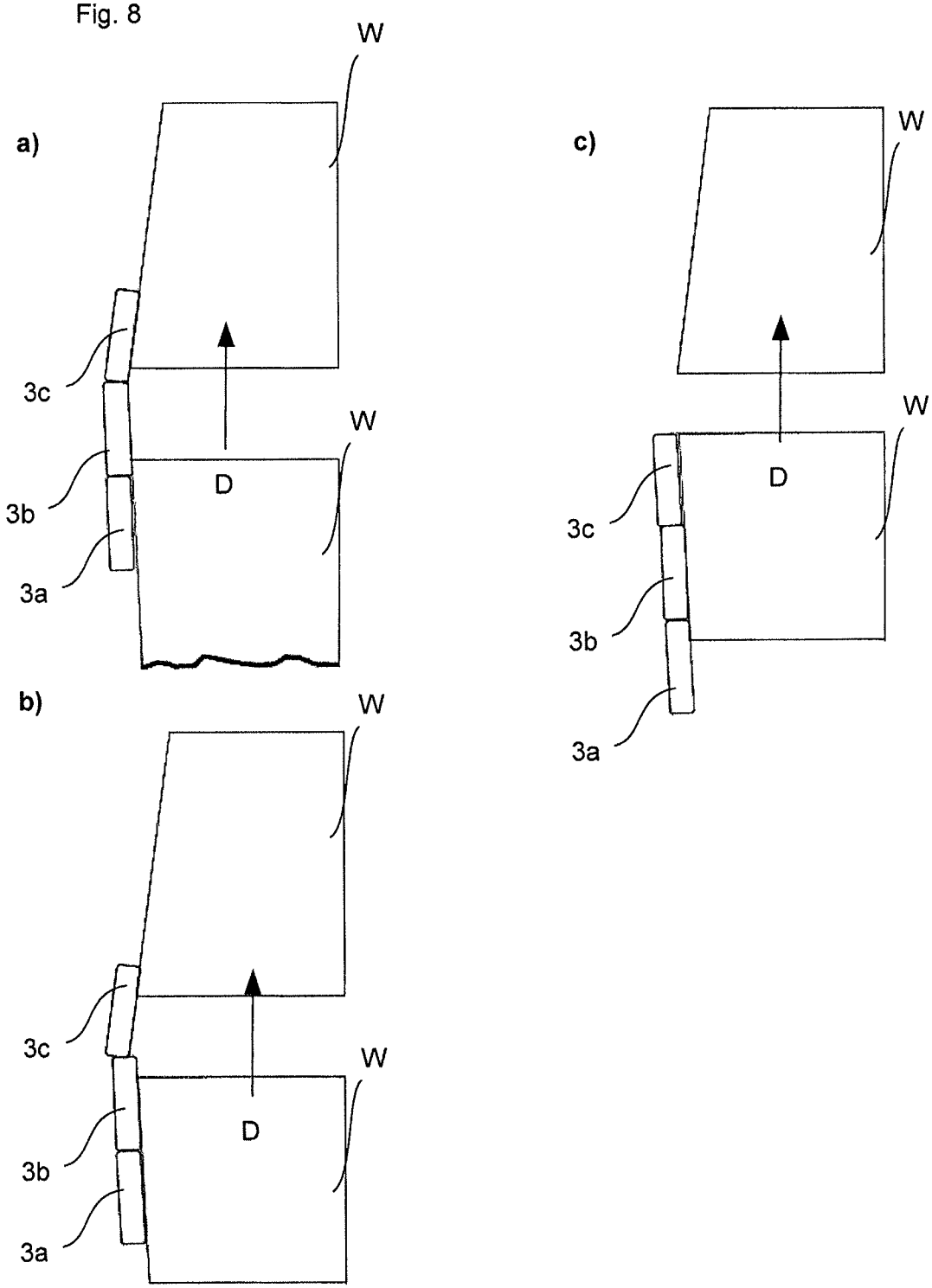
FIG. 8 shows further method steps following the sequence of FIG. 7.

In FIGS. 7 and 8, a process for aligning workpieces W in the region of the feeding device for a format machining and/or edge application machine is shown in detail.

First, a workpiece W engages with the infeed guides 3a to 3c and is aligned by means of the infeed guides 3a to 3c rotated in a horizontal plane with respect to the traveling direction D such that the side of the workpiece W opposite the infeed guides 3a to 3c is aligned parallel to the traveling direction. Accordingly, the present illustration relates to the second pass of the workpiece W, in which the side of the workpiece W to be aligned with respect to the infeed guides 3a to 3c is formatted by the milling cutter 11 such that the two longitudinal sides of the workpiece W, after this machining step, extend parallel to each other in the format machining and/or edge application machine.

In FIGS. 7a to 7c, the infeed guides 3a to 3c are oriented in a common direction in order to ensure the alignment of the workpiece W. During the movement of the workpiece in the direction of the format machining and/or edge application machine, the workpiece slides along the infeed guides 3a to 3c.

After the workpiece W has been moved further such that the workpiece W disengages from the first infeed guide 3a (FIG. 7d), in other words the first infeed guide 3a is no longer in contact with the workpiece, this first infeed guide 3a can already be realigned. Here, the alignment comprises a rotation in a horizontal plane and/or a linear adjusting movement in the horizontal plane (see FIGS. 7b to 7e). In this respect, the first infeed guide 3a is newly oriented such that it can be used for the alignment of a subsequent workpiece W (see FIG. 8a).

The second infeed guide 3b is also already rotated in FIG. 8a and engages with the subsequent workpiece W. This also happens subsequently with the third infeed guide 3c such that the infeed guides 3a to 3c are subsequently oriented along an imaginary alignment plane in order to ensure the alignment of the subsequent workpiece W.

Since the individual infeed guides 3a to 3c can be controlled and moved individually, a fluent transition between an alignment of a workpiece W and a subsequent workpiece W can therefore be achieved. Thus, it is possible to keep the gap between the workpieces W in the traveling direction D very small, by which the productivity is increased.

Figure 9:
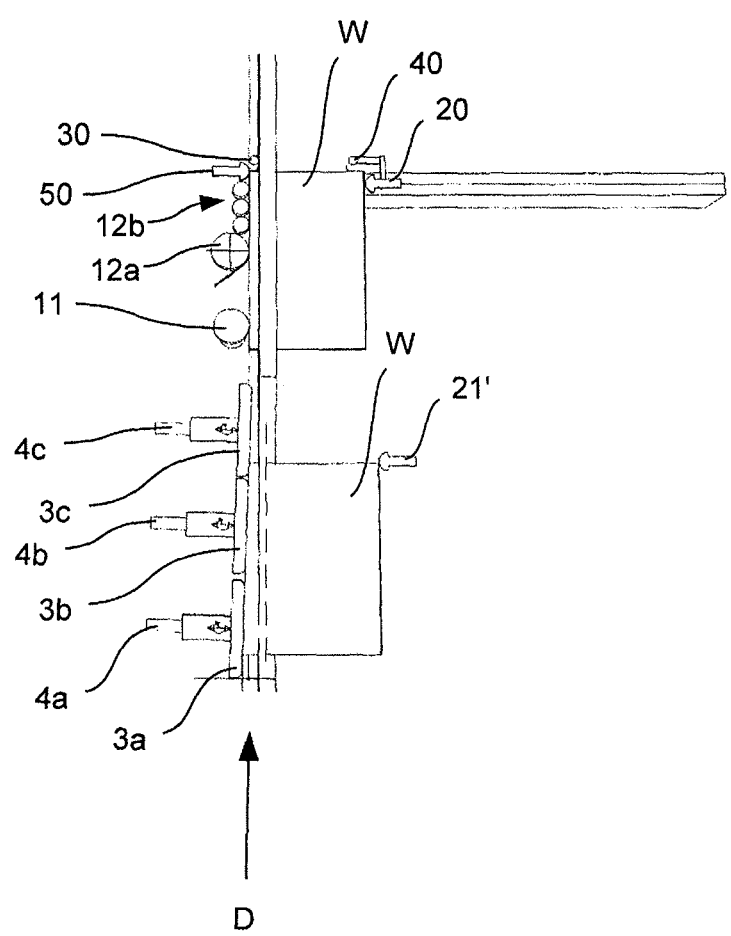
FIG. 9 is a plan view of a device according to the invention, which comprises different measuring devices.

In FIG. 9, a plan view of a feeding device as well as a format machining and/or edge application machine is shown, with the measuring devices and sensors partially shown individually in the previous illustrations here being shown together.

In particular, the shown device comprises the first measuring device 20 used for detecting the workpiece width (width dimension) and the inclination of the side of the workpiece W opposite the side of the workpiece to be machined and to be coated. In the present case, the first measuring device 20 is configured as a tactile sensor.

Moreover, the device comprises the second measuring device 30, 40 with the first sensor 30 and the second sensor 40. Due to the perspective view, the sensor 40 could not be recognized in the previous figures.

The first sensor 30 and the second sensor 40 are located on a common line perpendicular to the traveling direction W. In the present case, the first sensor 30 and the second sensor 40 are contactless sensors which in outer regions of the transverse side of a workpiece W perform a measurement with respect to an inclination of the transverse side in the third pass.

In the present case, the first sensor 30 and the second sensor 40 are provided below the conveying plane for the workpieces W and in sections detect regions of a transverse side of a workpiece W conveyed in the traveling direction D. To be able to detect the inclination of the transverse side of a workpiece W with a high degree of accuracy, the sensors 30, 40 are arranged such that outer regions of the transverse side of the workpieces W are detected.

Although contactless sensors are preferably used in the present embodiment, in a further variant the sensors 30, 40 can also be configured as contact sensors.

Moreover, the third measuring device 50 is shown in the present embodiment, which is used for a measurement for edge compensation. With the third measuring device 50, the measuring result can thus be improved again as regards the workpiece width determined by the first measuring device 20. In particular, uneven thicknesses of the edge bands and the edge band strip K as well as possibly changing application quantities of the adhesive agent can be taken into account, with the adhesive agent being applied either to the workpiece W or to the edge band strip K or optionally already being present on pre-coated edge band strips K. The third measuring device 50 is a further optional measuring device in comparison to the previously mentioned sensors.

Moreover, a further variant of the fourth measuring device 21' is shown in the illustration of FIG. 9, which is configured as a contact sensor in the present embodiment. In the embodiment illustrated in FIGS. 5 and 6, a contactless measuring device 21 was shown.

With the third measuring device 21, 21', shortly before the aligned workpiece W is handed over to the format machining and/or edge application machine, a measurement of the workpiece width and/or the workpiece inclination is performed, which is optionally used for a fine adjustment during the alignment of the workpiece W shortly before the workpiece W is clamped in the region of the format machining and/or edge application machine in the pass.

The invention claimed is:

1. A feeding device for a format machining or edge application machine, comprising:
   a conveying device for moving a workpiece in a traveling direction and an infeed mechanism comprising infeed rollers,
   further comprising a control device that horizontally adjusts an infeed guide in accordance with a width determined during a previous pass of the workpiece and rotates the workpiece in a horizontal plane in accordance with an inclination determined during the previous pass of the workpiece,
   wherein the infeed guide is arranged adjacent to the conveying device, and
   wherein the infeed guide is adjustable in the horizontal direction and rotatable in the horizontal plane with respect to the traveling direction.

2. The feeding device according to claim 1, characterized in that the control device guides the infeed guide, after alignment of a workpiece and, depending on a conveying speed of the workpiece, adjusts the infeed guide in the horizontal direction.

3. The feeding device according to claim 1 comprising multiple infeed guides, each of which is adjustable in the horizontal direction and rotatable in the horizontal plane with respect to the traveling direction of the workpiece.

4. The feeding device according to claim 1, characterized in that the feeding device further comprises a first measuring device to detect along the traveling direction of the workpiece a width dimension of the workpiece and an inclination of a side of the workpiece.

5. The feeding device according to claim 4 further comprising a second measuring device to detect transversely to the traveling direction the inclination of the side of the workpiece, and wherein the second measuring device comprises a first sensor and a second sensor arranged along an imaginary line extending perpendicular to the traveling direction of the workpiece.

6. The feeding device according to claim 5, further comprising a third measuring device to determine the workpiece width after machining of the side of the workpiece after application of a cutting machining or an edge application to the workpiece.

7. The feeding device according to claim 6, characterized in that the feeding device further comprises a fourth measuring device to detect along the traveling direction the workpiece width or an inclination of the side of the workpiece, wherein the fourth measuring device is arranged in a region before the workpiece is handed over to the format machining or edge application machine.

8. A format machining or edge application machine comprising the feeding device according to claim 1 and a machining tool comprising a milling cutter, wherein the machining tool is arranged on a same side of the conveying device as the infeed guide.

9. The format machining or edge application machine according to claim 8, further comprising an edge application station for applying an edge material strip on the same side of the conveying device as the infeed guide.

10. A method for feeding a workpiece to a format machining or edge application machine, the method comprising the following steps:
    conveying a workpiece in a first pass, wherein the workpiece is aligned with respect to an infeed guide and is subsequently fed to a machining tool or an edge application station,
    detecting along a traveling direction a width dimension of the workpiece and an inclination of a side of the workpiece, and
    conveying the workpiece in a second pass in an alignment rotated by 180 degrees, wherein the infeed guide is adjusted in accordance with the width dimension determined in the first pass and rotated in a horizontal plane in accordance with the determined inclination, and the workpiece is aligned with respect to the infeed guide.

11. The method according to claim 10, in which the infeed guide guides the workpiece, depending on the conveying speed of the workpiece, wherein the infeed guide is adjusted in a horizontal direction before the workpiece is handed over to the format machining or edge application machine.

12. The method according to claim 10, in which during the second pass, an inclination of a transverse side of the workpiece is detected by means of a second measuring device, wherein the second measuring device comprises a first sensor and a second sensor, which are arranged along an imaginary line extending perpendicular to the traveling direction.

13. The method according to claim 12, further comprising conveying the workpiece in a third pass in which the infeed guide is rotated in the horizontal plane in accordance with the inclination determined during the second pass and aligning the workpiece with respect to the infeed guide, wherein a width dimension and an inclination of the workpiece are determined during the third pass by means of a first measuring device.

14. The method according to claim 13, further comprising conveying the workpiece in a fourth pass in which the infeed guide is rotated in the horizontal plane in accordance with the inclination determined during the third pass and aligning the workpiece with respect to the infeed guide.

15. A feeding device for a format machining or edge application machine, comprising:
    a conveying device for moving a workpiece in a traveling direction and an infeed mechanism comprising infeed rollers,
    further comprising multiple infeed guides, each of which is adjustable in a horizontal direction and rotatable in a horizontal plane with respect to the traveling direction of the workpiece, and
    wherein at least one infeed guide is arranged adjacent to the conveying device.

16. The feeding device according to claim 15, further comprising a control device that horizontally adjusts at least one infeed guide in accordance with a width determined during a previous pass of the workpiece and rotates the workpiece in the horizontal plane in accordance with an inclination determined during the previous pass of the workpiece.

17. A format machining or edge application machine comprising the feeding device according to claim 15 and a machining tool comprising a milling cutter, wherein the machining tool is arranged on a same side of the conveying device as the infeed guide.

18. The format machining or edge application machine according to claim 17, further comprising an edge application station for applying an edge material strip on the same side of the conveying device as the infeed guide.

19. A feeding device for a format machining or edge application machine, comprising:

a conveying device for moving a workpiece in a traveling direction and an infeed mechanism comprising infeed rollers, further comprises a first measuring device to detect along a traveling direction of the workpiece a width dimension of the workpiece and an inclination of a side of the workpiece, wherein an infeed guide is arranged adjacent to the conveying device, and wherein the infeed guide is adjustable in a horizontal direction and rotatable in a horizontal plane with respect to the traveling direction.

20. The feeding device according to claim 19, further comprising a control device that horizontally adjusts the infeed guide in accordance with a width determined during a previous pass of the workpiece and rotates the workpiece in the horizontal plane in accordance with an inclination determined during the previous pass of the workpiece.

21. A format machining or edge application machine comprising the feeding device according to claim 19 and a machining tool comprising a milling cutter, wherein the machining tool is arranged on a same side of the conveying device as the infeed guide.

22. The format machining or edge application machine according to claim 21, further comprising an edge application station for applying an edge material strip on the same side of the conveying device as the infeed guide.

* * * * *